United States Patent
Lee

(10) Patent No.: US 8,290,694 B2
(45) Date of Patent: Oct. 16, 2012

(54) METHOD FOR SENSING COVERING STATE ACCORDING TO VELOCITY AND SYSTEM FOR PROVIDING TRAFFIC INFORMATION USING THE SAME METHOD

(75) Inventor: Hong Kyu Lee, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 572 days.

(21) Appl. No.: 12/523,401

(22) PCT Filed: Dec. 10, 2007

(86) PCT No.: PCT/KR2007/006396
§ 371 (c)(1),
(2), (4) Date: Jul. 16, 2009

(87) PCT Pub. No.: WO2008/088128
PCT Pub. Date: Jul. 24, 2008

(65) Prior Publication Data
US 2010/0049429 A1    Feb. 25, 2010

(30) Foreign Application Priority Data

Jan. 18, 2007  (KR) ........................ 10-2007-0005654

(51) Int. Cl.
*G06F 19/00*    (2011.01)
(52) U.S. Cl. .................. 701/119; 701/117; 340/905
(58) Field of Classification Search ............... 701/93, 701/117, 119; 340/905, 907
See application file for complete search history.

(56) References Cited

U.S. PATENT DOCUMENTS

| 7,376,509 | B2* | 5/2008 | Endo et al. ............. 701/423 |
| 7,840,339 | B2* | 11/2010 | Kim et al. ............. 701/119 |
| 2006/0184322 | A1* | 8/2006 | Kim ............. 701/211 |
| 2007/0150168 | A1* | 6/2007 | Balcom et al. ............. 701/117 |
| 2007/0155404 | A1* | 7/2007 | Yamane et al. ............. 455/456.1 |
| 2007/0198160 | A1* | 8/2007 | Sheynblat ............. 701/93 |
| 2007/0208498 | A1* | 9/2007 | Barker et al. ............. 701/117 |
| 2007/0273559 | A1* | 11/2007 | Furuya et al. ............. 340/995.13 |

FOREIGN PATENT DOCUMENTS

| JP | 10-307993 | 11/1998 |
| KR | 10-1998-0068114 | 10/1998 |
| KR | 10-2000-0065628 | 11/2000 |
| KR | 10-2001-0045468 | 6/2001 |
| KR | 10-0337701 | 5/2002 |
| KR | 10-2003-0039578 | 5/2003 |
| KR | 10-2004-0037689 | 5/2004 |
| KR | 10-2006-0110085 | 10/2006 |

OTHER PUBLICATIONS

International Search Report for PCT/KR2007/006396 mailed Mar. 20, 2008.
Written Opinion for PCT/KR2007/006396 mailed Mar. 20, 2008.

* cited by examiner

*Primary Examiner* — Helal A Algahaim
(74) *Attorney, Agent, or Firm* — Nixon & Vanderhye PC

(57) ABSTRACT

Disclosed is a method for sensing a traveling state based on a speed. The method for sensing the traveling state based on the speed includes outputting a mean speed C for each link with respect to a number of total traversing times of a predetermined path, and updating a reference speed B with the outputted mean speed C, and measuring a speed A while traversing the predetermined path, and comparing the measured speed A with the updated reference speed B, thereby displaying the traveling state.

15 Claims, 4 Drawing Sheets

(A)

(B)

(C)

(A)

(B)

METHOD FOR SENSING COVERING STATE ACCORDING TO VELOCITY AND SYSTEM FOR PROVIDING TRAFFIC INFORMATION USING THE SAME METHOD

This application is the U.S. national phase of International Application No. PCT/KR2007/006396 filed 10 Dec. 2007 which designated the U.S. and claims priority to Korean Patent Application No. 10-2007-0005654 filed 18 Jan. 2007, the entire contents of each of which are hereby incorporated by reference.

TECHNICAL FIELD

The present invention relates to a navigation system of a vehicle, and more particularly, to a method for sensing a traveling state based on a speed, and a system for providing traffic information using the method, in which a road condition of a path frequently traversed is acquired in advance to thereby provide more substantial traffic information and enable the traffic information to be shared.

BACKGROUND ART

Currently, opportunities for a search and sharing of various information in a radio communication environment such as with a portable computer, a mobile phone, and the like, have increased due to services provided by a communication network.

In this regard, a navigation system (hereinafter, referred to as 'user terminal') provides information helpful for the traveling of vehicles using an artificial satellite orbiting the Earth, and may be referred to as an automatic car navigation system.

The user terminal receives predetermined data from a Global Positioning System (GPS) satellite using a GPS receiver, and calculates a position of the user terminal based on the received data.

The user terminal of the vehicle may receive GPS signals from three satellites, from among a plurality of artificial satellites orbiting the Earth regardless of where the vehicle is traveling, and calculate the position of the user terminal based on the GPS signals received from the satellites.

The user terminal of the vehicle provides various traveling information based on position information acquired by calculating the position of the user terminal. The user terminal has been used for position calculation and navigation of a large-sized vehicle such as an aircraft, a ship, and the like, however, is currently widely used for a motor vehicle.

The user terminal provides various data such as current position information of a vehicle, traveling route information determined by a user, map information related with the position information and the traveling route information, traffic state information, and the like.

Also, the user terminal measures a current traveling speed of the vehicle, and displays traffic information (hereinafter, referred to as traveling state) according to the traveling speed, such as a delay state, congestion state, normal state, and the like.

An existing scheme for providing the traveling state according to the traveling speed measures a traveling speed for each link while traversing a path determined by a user, and compares the measured speed with a reference speed to thereby provide the traveling state.

For example, when it is assumed that the reference speed is 50 km/h, the traveling state may be displayed as 'normal' in the case of the measured speed of more than 50 km/h, displayed as 'delay' in the case of the measured speed between 50 km/h and 'the reference speed-40 km/h', and displayed as 'congestion' in the case of the measured speed of less than 'the reference speed-40 km/h'.

However, there arises a problem in that different road conditions varying according to a signal system, a road surface state, a traffic network, and the like, which are used for determining the traveling state, are not considered due to the fixed reference speed.

Also, the user terminal may be mainly used for checking a traveling state of a road frequently used during rush hour than for checking a traveling state of an unfamiliar road.

Since paths requiring traffic information such as during rush hour are likely to be fixed by most users, there arises a need for a system for providing information of where a time required for traveling on a road frequently used is either shorter than usual or longer than usual, is predicted.

DISCLOSURE OF INVENTION

Technical Goals

An aspect of the present invention provides a method for sensing a traveling state based on a speed in which a road condition of a path frequently traversed is acquired in advance to thereby display a traveling state according to the speed.

An aspect of the present invention provides a system for providing traffic information in which data of another user terminal is shared to provide more accurate traffic information even without acquiring a road condition in advance.

Technical Solutions

According to an aspect of the present invention, there is provided a method for sensing a traveling state based on a speed, which includes: outputting a mean speed C for each link with respect to a number of total traversing times of a predetermined path, and updating a reference speed B with the outputted mean speed C, and measuring a speed A while traversing the predetermined path, and comparing the measured speed A with the updated reference speed B, thereby displaying the traveling state.

In this instance, the method for sensing the traveling state based on the speed according to the present invention may further include transmitting, to a server for collecting data, the outputted mean speed C.

According to an aspect of the present invention, there is provided a system for providing traffic information, which includes: a user terminal for either outputting a mean speed C for each link with respect to a number of total traversing times of a predetermined path, or requesting the mean speed C having been collected for each link, thereby displaying a traveling state according to a speed based on the mean speed C; and a server for either collecting the mean speed C outputted from the user terminal, or providing the collected mean speed C to the user terminal according to the request of the user terminal.

According to the present invention, a road condition of a path frequently used by a user is acquired using a mean speed for each link with respect to the predetermined path of the user, and thereby a traveling state based on a speed is displayed. Also, a mean speed for each link of another user is used by sharing the mean speed for each link of the user terminal even without directly acquiring the road condition of the path, and thereby a traveling state based on more accurate speed is displayed.

BEST MODE FOR CARRYING OUT THE INVENTION

Figure 1:
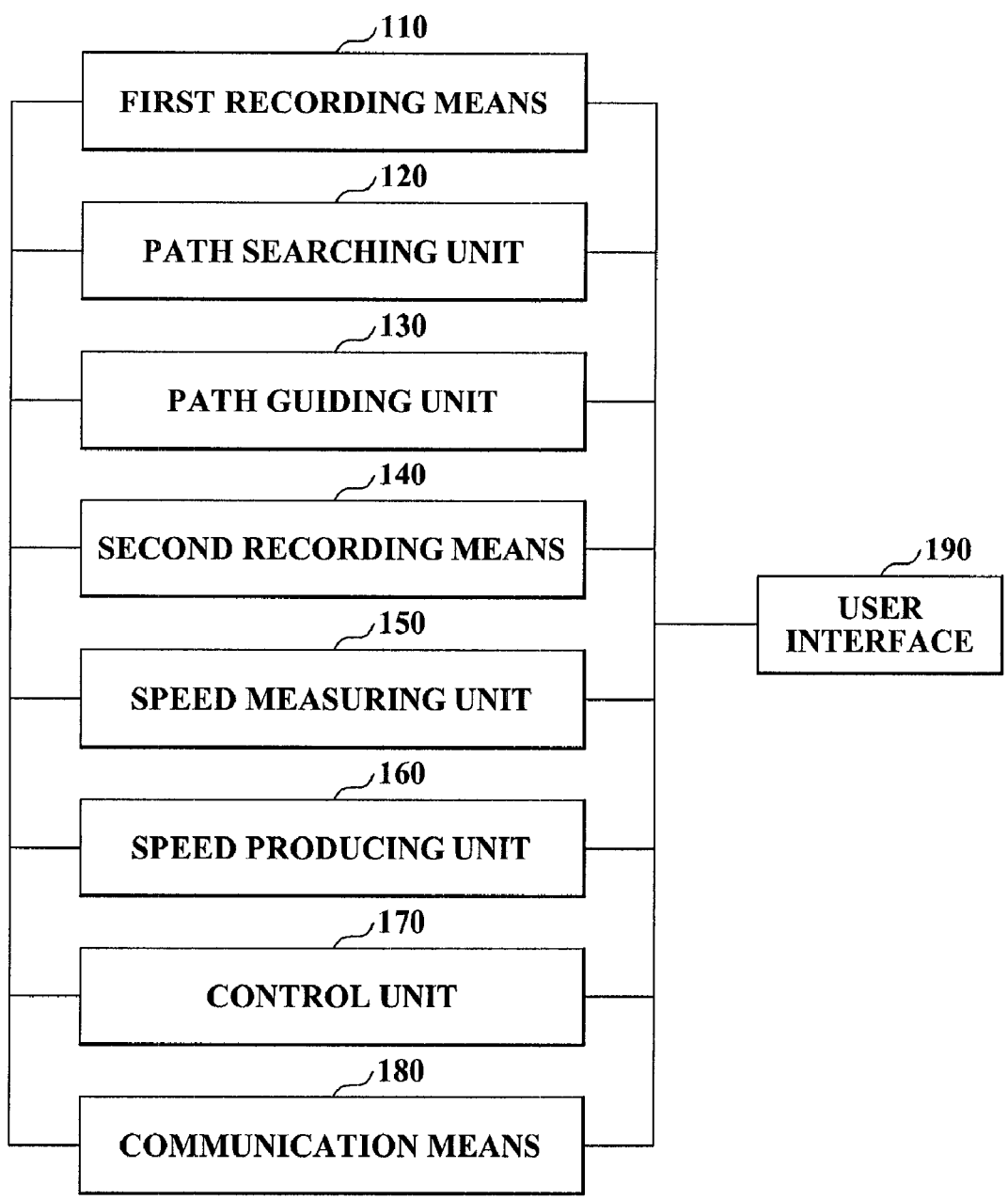
FIG. 1 is a diagram illustrating an entire configuration of a navigation system (hereinafter, also referred to as a user terminal) used for describing a method for sensing a traveling state based on a speed according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating an entire configuration of a navigation system (hereinafter, also referred to as a user terminal) used for describing a method for sensing a traveling state based on a speed according to an exemplary embodiment of the present invention.

As illustrated in FIG. 1, the navigation system of a user terminal mainly includes a first recording means 110, a path searching unit 120, a path guiding unit 130, and a user interface 190.

A user selects a desired destination using the user interface 190.

In the first recording means 110, road map data and path guide data related with the road map data is recorded therein.

The path searching unit 120 ascertains a current position of a vehicle using Global Positioning System (GPS) signals received via a GPS receiver (not shown). Then, the path searching unit 120 searches for a path stretching from the current position to a desired destination of a user using the road map data stored in the first recording means 110 to thereby generate path information.

The path guiding unit 130 provides a path guide to the user based on the path information generated in the path searching unit 120.

Also, referring to FIG. 1, the navigation system of the user terminal further includes a second recording means 140, a speed measuring unit 150, a speed producing unit 160, a communication means 180, and a control unit 170.

The navigation system utilizes a method for sensing a traveling state based on a speed, which includes outputting a mean speed C for each link with respect to a number of total traversing times of a predetermined path, and updating a reference speed B with the outputted mean speed C, and measuring a speed A while traversing the predetermined path, and comparing the measured speed A with the updated reference speed B, thereby displaying the traveling state.

The second recording means 140 records a predetermined path determined by a user, the speed A for each link measured each time the predetermined path is traversed, and the reference speed B used for determining the traveling state based on the speed, respectively.

Preferably, the predetermined path is determined to be a path frequently used by the user using the user interface 190.

The predetermined path is composed of at least one link, and an identification (ID) is provided for each link.

The speed measuring unit 150 measures a traveling speed of the vehicle using GPS signals received via the GPS receiver. The speed measuring unit 150 measures a speed A for each link each time the predetermined path is traversed, and records the measured speed A in the second recording means 140.

A data configuration of the speed A for each link recorded in the second recording means 140 is represented by

TABLE 1

| Link ID | Speed 1 | Speed 2 | ... | Speed N |
| --- | --- | --- | --- | --- |

In order to enhance data reliability with respect to the speed A for each link, when the speed A for each link measured in the speed measuring unit 150 is less than a speed limit of the predetermined path, the second recording means 140 stores the speed A for each link as is. Conversely, when the speed A for each link is greater than the speed limit, the second recording means 140 replaces the speed A for each link with the speed limit, and stores the replaced speed limit.

The speed limit may be determined to be 120% of the speed limit applied when the corresponding link is traversed.

The speed producing unit 160 produces a mean speed C for each link by reading each speed A for each respective link recorded in the second recording means 140. A data configuration of the produced mean speed C for each link is represented by

TABLE 2

| Link ID | Mean speed | A number of traversing times |
| --- | --- | --- |

In order to enhance data reliability with respect to the mean speed C for each link, a scheme for outputting the mean speed C with respect to remaining speeds excluding a maximum speed and a minimum speed from among the stored speeds A may be adopted. In this case, deducting two from the number of total traversing times is a number of the remaining traversing times and may be preferably stored in the data configuration of Table 2.

The control unit 170 uses the mean speed C for each link produced by the speed producing unit 160 for updating the reference speed B stored in the second recording means 140.

Specifically, the control unit 170 updates the produced mean speed C for each link using the reference speed B used for determining a traveling state of a corresponding link.

Next, the speed measuring unit 150 measures the speed A for each link while traversing the predetermined path, and the control unit 170 compares the measured speed A for each link and the reference speed B stored in the second recording means 140 to thereby determine a current traveling state.

For example, when it is assumed that the updated reference speed B is 50 km/h, the traveling state may be displayed as 'normal' in the case of the speed A for each link of more than the reference speed B, displayed as 'delay' in the case of the speed A of less than the reference speed B and more than 'the reference speed B-40 km/h', and displayed as 'congestion' in the case of the speed A of less than 'the reference speed B-40 km/h'.

Thus, the reason the path frequently used by the user is determined as the predetermined path, and the reason the mean speed C for each link with respect to the number of total traversing times of the predetermined path is produced is to acquire a road condition of the predetermine path.

Further, the navigation system according to the present invention provides a system for providing traffic information by which reference speeds acquired between all of the user terminals (that is, the mean speed C for each link) are shared.

For this purpose, the user terminal may further include the communication means 180 used for transmitting the mean speed C to a server for each link produced as described above.

The user terminal automatically or manually transmits, to the server via the communication means 180, traffic information acquired by the user terminal itself, that is, the mean speed C for each link so as to share the traffic information with another user.

Hereinafter, an entire configuration of the system for providing traffic information according to the present exemplary embodiment will be described in detail.

Figure 2:
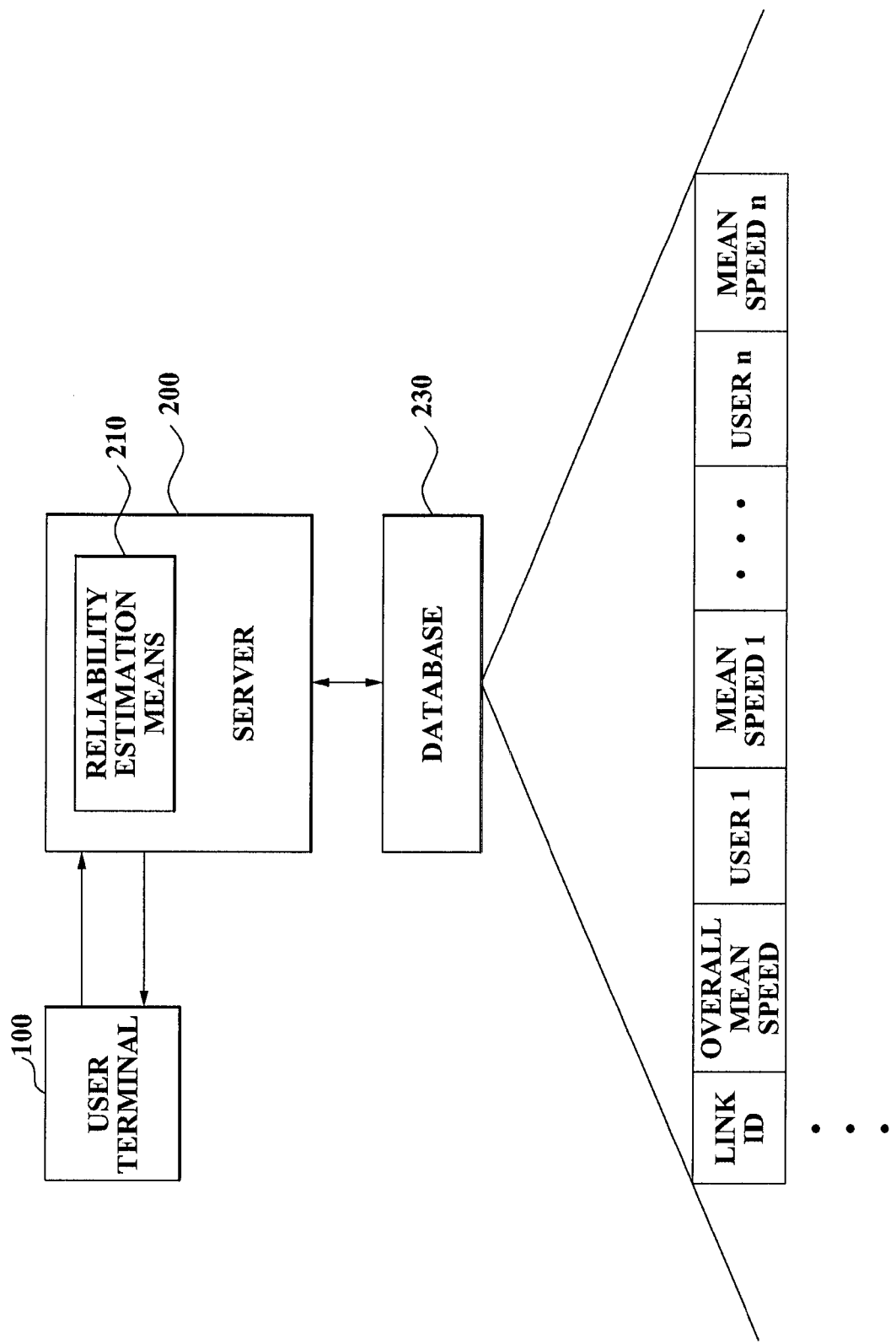
FIG. 2 is a diagram illustrating all operations of a system for providing traffic information using a method for sensing a traveling state based on a speed according to an exemplary embodiment of the present invention.

FIG. 2 is a diagram illustrating all operations of a system for providing traffic information using a method for sensing a traveling state based on a speed according to an exemplary embodiment of the present invention.

As illustrated in FIG. 2, the system for providing traffic information includes a user terminal 100 for either outputting a mean speed C for each link with respect to a number of total traversing times of a predetermined path, or requesting the mean speed C having been collected for each link, thereby displaying a traveling state according to a speed based on the mean speed C, and a server 200 for either collecting the mean speed C outputted from the user terminal, or providing the collected mean speed C to the user terminal 100 according to the request of the user terminal.

Here, the server 200 includes a reliability estimation means 210 for inspecting effectiveness of the mean speed C transmitted from the user terminal, and a database 230 for storing the mean speed C having passed through the effectiveness inspection performed by the reliability estimation means 210 and also storing the overall mean speed D of the mean speed C.

The server 200 receives the mean speed C for each link from a plurality of user terminals 100. Then, the received mean speed C passes through the reliability estimation means 210. The server 200 determines whether the received mean speed C for each link having passed through the reliability estimation means 210 is substantially within a range capable of traversing.

Only the mean speed C for each link being substantially within the range capable of traversing is stored in the database 230 to thereby register the mean speed C in the server 200.

Next, the server 200 outputs an overall mean speed D with respect to all of the mean speeds C received from the user terminal 100, and provides the produced overall mean speed D for each link when a request is received from the user terminal 100.

A data configuration of the overall mean speed D for each link is represented by

TABLE 3

| Link ID | Overall mean speed | User 1 | Mean speed 1 | ... | User N | Mean speed N |
|---------|--------------------|--------|--------------|-----|--------|--------------|

According to Table 3, an overall mean speed with respect to all users and a mean speed with respect to respective users are recorded in the database 230.

Hereinafter, a method for sensing a traveling state of the user terminal 100 using the overall mean speed D for each link of the server 200 will be described in detail.

The user determines a path using the user interface 190, and requests an overall mean speed D for each link with respect to the predetermined path to the server 200.

The overall mean speed D for each link provided by the server 200 is received via the communication means 180, and the reference speed B recorded in the second recording means 140 is updated with the received overall mean speed D for each link.

Also, the speed A for each link measured by the speed measuring unit 150 while traversing the predetermined path is compared with the updated reference speed B to thereby determine a current traveling state of the vehicle.

The user interface used for sharing the traffic information of the user terminal described above will be hereinafter described in detail.

Figure 3:
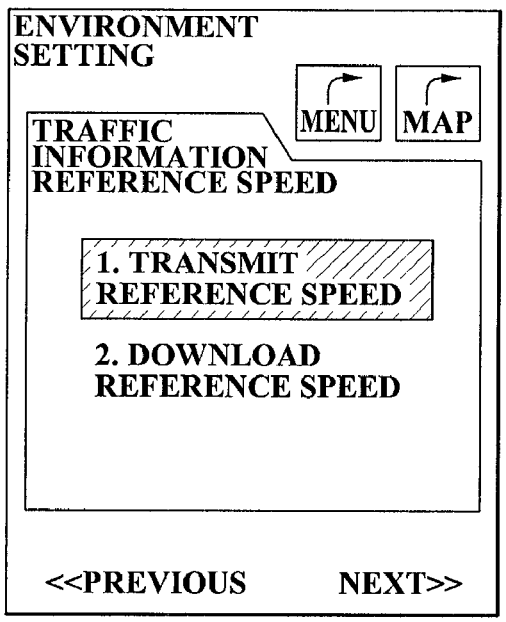
FIGS. 3 and 4 are diagrams illustrating a screen of a user interface used for sharing traffic information of a user terminal.
Figure 3:
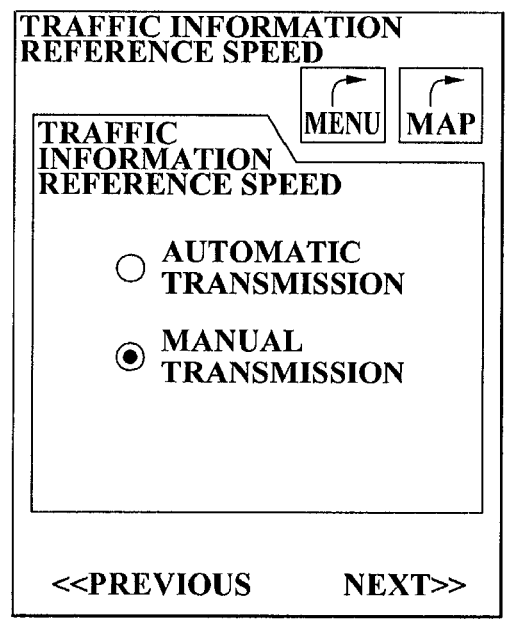
Figure 3:
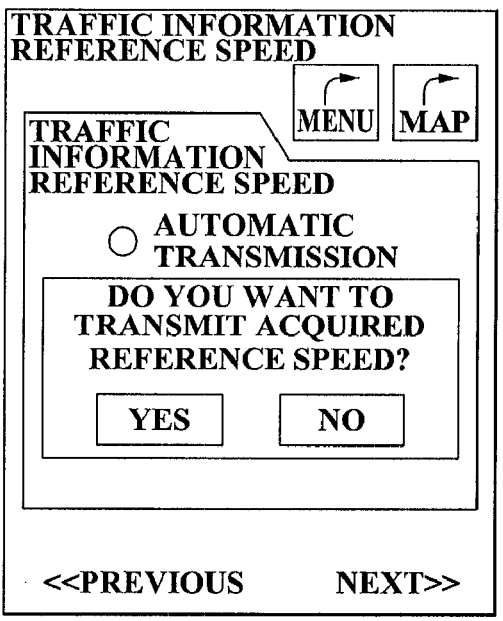

FIG. 3 illustrates a user menu screen for transmitting the reference speed acquired by the user terminal (that is, the mean speed C for each link) to the server 200.

FIG. 3 (A) illustrates a high-order menu used for determining the reference speed. The high-order menu may be configured such that the high-order menu is included in a specific list of the highest menu of the system, and thus an operation for advancing from the preceding step is performed starting from the highest menu in a stepwise manner. Alternatively, the high-order menu may include a hot key used for directly advancing from the preceding step.

The list of FIG. 3 (A) may include a menu of 'TRANSMIT REFERENCE SPEED' used for transmitting the reference speed to the server, and a menu of 'DOWNLOAD REFERENCE SPEED' used for downloading the reference speed from the server.

FIG. 3 (B) illustrates a low-order menu corresponding to the menu of 'TRANSMIT REFERENCE SPEED' of FIG. 3 (A). A menu screen of the low-order menu is set such that the reference speed acquired by the user terminal is either automatically transmitted for each predetermined cycle, or manually transmitted only when a request of the user is received.

Specifically, when 'AUTOMATIC TRANSMISSION' of FIG. 3 (B) is selected, the reference speed recorded in the second recording means 140 is automatically transmitted to the server 200 for each predetermined cycle.

In this instance, the predetermined cycle may be a number of traversing times of the predetermined path determined by the user (for example, ten times), or a time period required for traversing (for example, ten days).

Conversely, when 'MANUAL TRANSMISSION' of FIG. 3 (B) is selected, the reference speed recorded in the second recording means 140 at the time when 'MANUAL TRANSMISSION' is inputted by the user is transmitted to the server 200.

The menu of 'MANUAL TRANSMISSION' may be configured to include a screen indicating a massage of FIG. 3 (C) (for example, 'DO YOU WANT TO TRANSMIT ACQUIRED REFERENCE SPEED?'), so that the transmission of the reference speed to the server 200 is started when a request of the user is received.

Figure 4:
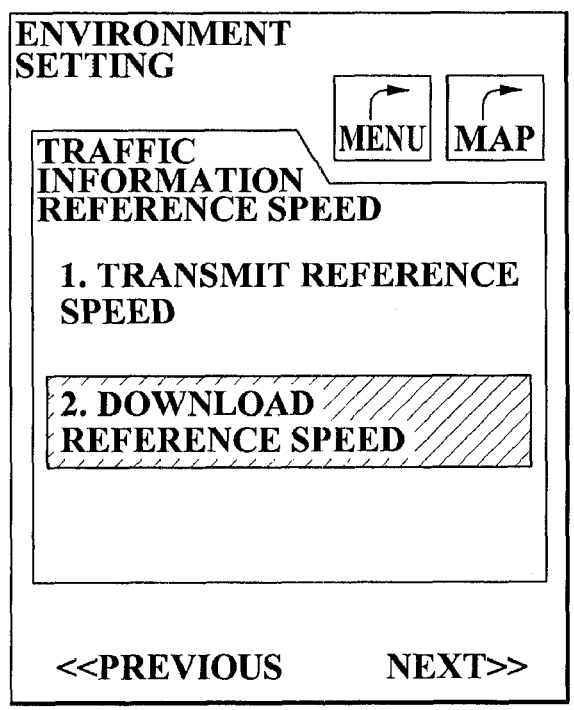
Figure 4:
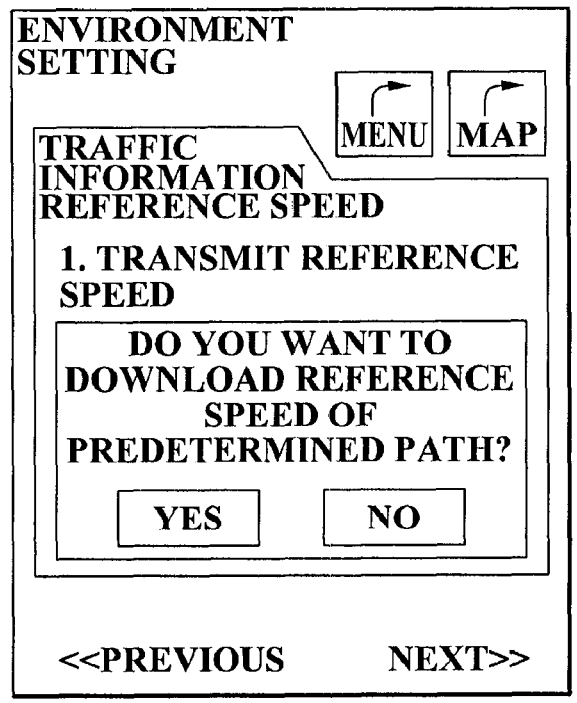

FIG. 4 illustrates a user menu screen for downloading the overall mean speed D for each link provided by the server with respect to the predetermined path determined by the user terminal.

FIG. 4 (A) is the same as FIG. 3 (A).

A menu of 'DOWNLOAD REFERENCE SPEED' of FIG. 4 (A) is used for requesting the overall mean speed D for each link stored in the database 230 of the server 200 with respect to a path being acquired or not acquired by the user terminal.

When 'DOWNLOAD REFERENCE SPEED' is selected, the overall mean speed D for each link corresponding to the predetermined path determined by the user is provided from the server 200. The overall mean speed D transmitted from the server 200 is downloaded and the downloaded overall mean speed D is used as the reference speed for determining the traveling state.

The menu of 'DOWNLOAD REFERENCE SPEED' may be configured to include a screen indicating a massage of FIG. 4 (B) (for example, 'DO YOU WANT TO DOWNLOAD REFERENCE SPEED OF PREDETERMINED PATH?'), so that the download of data is started when a request of the user is received.

The menu of 'DOWNLOAD REFERENCE SPEED' may receive the overall mean speed D for each link with respect to all of the paths having been collected in the database 230 as well as the predetermined path determined by the user.

The method for sensing the traveling state based on the speed according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

As described above, according to the present invention, a user acquires a road condition of a path frequently used by the user, and actively corrects the reference speed for determining the traveling state of the path, thereby increasing reliability of the traveling state (for example, delay, congestion, normal, and the like) based on the speed.

According to the present invention, the reference speed of the path having been acquired is shared between the user terminals, thereby increasing reliability of the traveling state even including an unfamiliar path.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for sensing by a user terminal a traveling state based on a speed, the method comprising:
outputting by the user terminal a mean speed C for each link with respect to a number of total traversing times of a predetermined path, and updating a reference speed B with the outputted mean speed C;
measuring by the user terminal a speed A while traversing the predetermined path, and comparing the measured speed A with the updated reference speed B, thereby displaying the traveling state; wherein the outputting by the user terminal of the mean speed C includes:
determining by the user terminal in advance a path frequently used by a user; measuring by the user terminal a speed A for each link for each time the predetermine predetermined path is traversed;
outputting by the user terminal the mean speed C of the measured speed A with respect to the number of total traversing times of the predetermined path; storing by the user terminal the measured speed A each time the predetermined path is traversed; and
outputting by the user terminal the mean speed C of remaining speeds excluding a maximum speed and a minimum speed from among the stored speeds A.

2. The method of claim 1, further comprising:
transmitting by the user terminal, to a server for collecting data, the outputted mean speed C, wherein the server outputs an overall mean speed D with respect to all of the mean speeds C.

3. The method of claim 2, further comprising:
downloading by the user terminal the overall mean speed D from the server;
updating by the user terminal the reference speed B with the downloaded total mean speed D; and
measuring by the user terminal the speed A while traversing the predetermined path, and comparing the measured speed A with the updated reference speed B, thereby displaying the traveling state.

4. The method of claim 1, wherein the storing by the user terminal includes:
storing by the user terminal the measured speed A when the measured speed A is less than a speed limit of the predetermined path; and
storing by the user terminal the speed limit as a speed for each corresponding link when the measured speed A is greater than the speed limit of the predetermined path.

5. The method of claim 1, wherein the measuring by the user terminal of the speed A includes:
comparing by the user terminal the speed A with the reference speed B, thereby determining whether the traveling state of the predetermined path is a delay, congestion, or normal state; and
displaying by the user terminal the determined traveling state.

6. The method of claim 3, wherein the displaying by the user terminal of the traveling state includes:
displaying by the user terminal the traveling state as the normal state when the speed A is greater than the reference speed B, and
displaying by the user terminal the traveling state as the delay or congestion state when the speed A is less than the reference speed B.

7. The method of claim 2, wherein the transmitting by the user terminal transmits the mean speed C to the server according to a user's request.

8. The method of claim 2, wherein the transmitting by the user terminal automatically transmits the mean speed C to the server for each predetermined cycle.

9. A non-transitory computer-readable recording medium storing a program for implementing the method of claim 1.

10. A user terminal for providing traffic information, the user terminal comprising:
a speed measuring unit for measuring the speed A of the predetermined path for each time the predetermined path is traversed;
a recording means for storing the speed A measured in the speed measuring unit, and for storing a reference speed B for determining the traveling state;
a speed outputting unit for outputting the mean speed C of the speed A stored in the recording means;

a control unit for updating the reference speed B of the recording means with the mean reed C outputted from the speed outputting unit and comparing the speed A measured by the speed measuring unit with the updated reference speed B, thereby displaying the traveling state; wherein the user terminal includes:

a communication means for receiving the overall mean speed D of the predetermined path from the server according to a user's request;

a recording means for storing a reference speed B for determining the total mean speed D received by the communication means and the traveling state;

a speed measuring unit for measuring the speed A of the predetermined path while traversing the predetermined path; and a control unit for updating the reference speed B stored in the recording means with the overall mean speed D, and comparing the speed A measured in the speed measuring unit with the updated reference speed B, thereby displaying the traveling state.

11. The user terminal of claim 10, wherein the user terminal further includes:

a communication means for transmitting, to a server, the mean speed C stored in the recording means under control of the control unit.

12. The user terminal of claim 11, wherein the user terminal further includes:

a user interface for either transmitting the mean speed C to the server, or inputting a user command for receiving the overall mean speed D of the server.

13. The user terminal of claim 10, wherein the server includes:

a reliability estimation means for inspecting effectiveness of the mean speed C transmitted from the user terminal; and a database for storing the mean speed C having passed through the effectiveness inspection performed by the reliability estimation means and also storing the overall mean speed D of the mean speed C.

14. The user terminal of claim 10, wherein:

the server collects the mean speed C outputted from the user terminal, or provides the collected mean speed C to the user terminal according to the request of the user terminal.

15. The user terminal of claim 11, wherein:

the server outputs an overall mean speed D with respect to all of the mean speeds C, and provides the outputted overall mean speed D according to a request of a user.

\* \* \* \* \*